Feb. 16, 1926.  
J. R. ROSE  
GASEOUS FUEL PRODUCTION  
Filed May 28, 1923  
1,573,524
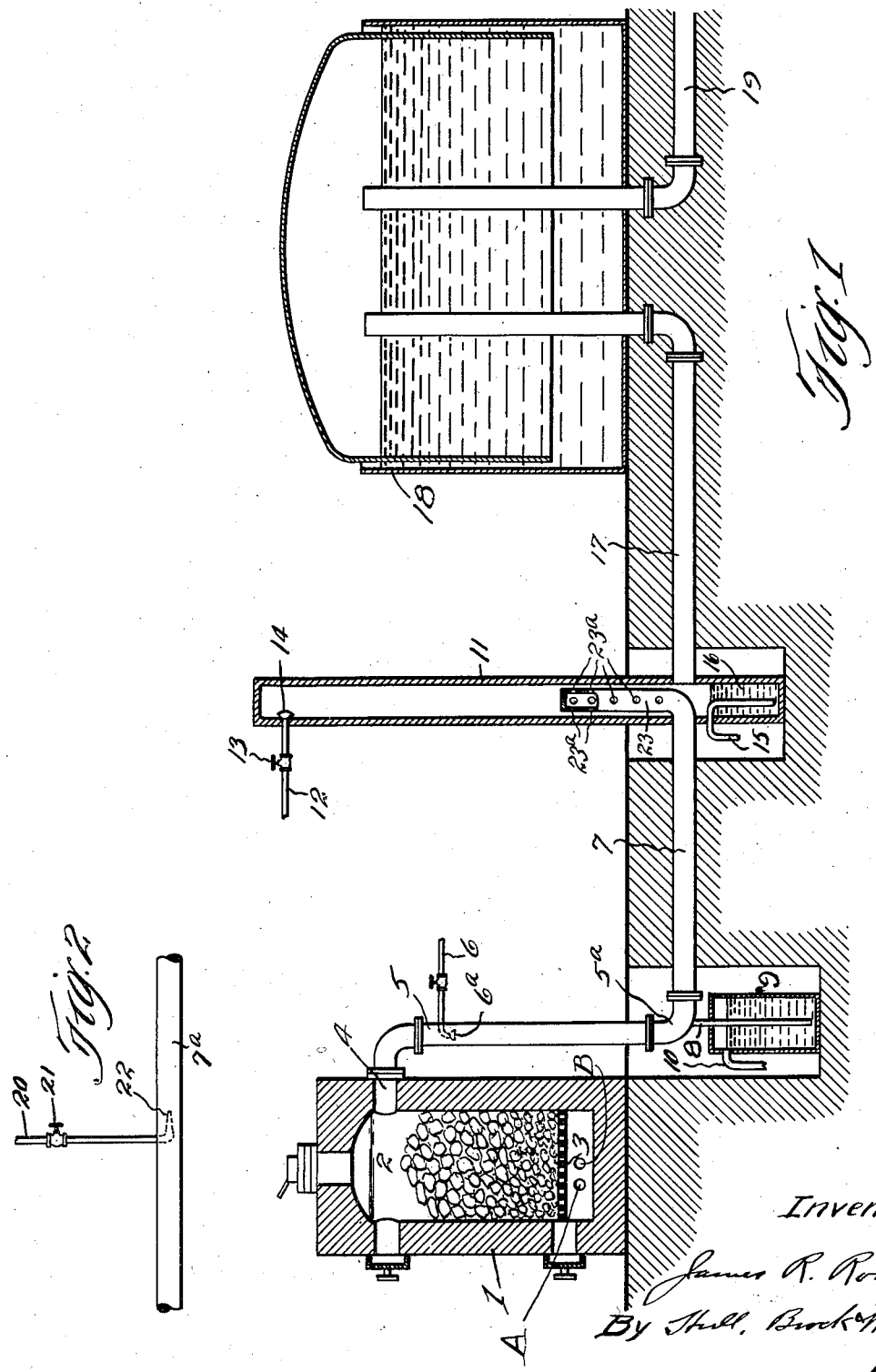

Patented Feb. 16, 1926.

1,573,524

UNITED STATES PATENT OFFICE.

JAMES R. ROSE, OF EDGEWORTH, PENNSYLVANIA, ASSIGNOR OF ONE-HALF TO JOHN HARRIS, OF CLEVELAND, OHIO.

GASEOUS FUEL PRODUCTION.

Application filed May 28, 1923. Serial No. 641,883.

*To all whom it may concern:*

Be it known that I, JAMES R. ROSE, a citizen of the United States, residing at Edgeworth, in the county of Allegheny and State of Pennsylvania, have invented a certain new and useful Improvement in Gaseous Fuel Production, of which the following is a full, clear, and exact description, reference being had to the accompanying drawings.

This invention relates to gaseous fuel and more particularly to the production of a gaseous fuel which is adapted for ordinary domestic and fuel purposes and as a substitute for ordinary artificial illuminating gas.

The general purpose and object of the invention is to produce a new gaseous fuel for the above purposes which can be manufactured cheaply and with a relatively inexpensive plant or installation and which fuel will be capable of developing sufficient heat units, in its combustion, to render it efficient for the purposes for which it is designed.

As is well known, ordinary blue, or unenriched, water gas is produced by the blowing of air and steam through incandescent coke and contains about 300 B. t. u. per cubic foot. The comparatively low B. t. u. content makes the gas unsuitable for ordinary heating and domestic purposes.

By means of my invention, the B. t. u. content of this gas is raised to such an extent and in such a manner as will enable the resultant gaseous fuel to accomplish the objects for which it is intended and to be produced and sold at a cost which is lower than that of ordinary artificial gas.

In order to produce a gas in accordance with my invention, I increase the B. t. u. content of the blue water gas by means of a suitable hydrocarbon which is added to such gas after the same has been cleaned and any deterimental substances removed. This addition may be accomplished by adding to the blue water gas a liquefied hydrocarbon gas, and more particularly a liquefied hydrocarbon gas of the paraffin series, such as ethane, propane, and butane; as well as by mixing such gas with ethylene. The gases referred to are usually liquefied by compression and dispensed in drums and tank cars; and each possesses a vapor tension of at least twenty-five pounds per square inch and not greater than five hundred pounds per square inch at atmospheric pressure and ordinary temperatures, as from 30° F. to 100° F.

In the drawings forming part hereof, I have illustrated the manner in which a gas embodying my invention may be produced in a simple and effective manner and with a comparatively economical plant or installation. In such drawings, Fig. 1 represents a longitudinal sectional view through such gas-producing plant, and Fig. 2 a detail in elevation showing a modification of the means for admitting hydrocarbon to the blue, or uncarburetted, water gas.

Describing the parts in said drawings by reference characters, 1 denotes the generator for the blue or uncarburetted water gas, the generator being of ordinary standard construction and consisting of a generating chamber 2 in which the incandescent coke is contained, with a grate 3 and a gas outlet 4. Beneath the grate is an air inlet A and a steam inlet B.

The gas, having been produced in the usual manner by blowing air and steam alternately from the inlets A and B, respectively through the incandescent coke, is conducted through the outlet 4 into the downwardly directed conduit section 5 having in the upper part thereof a spraying device 6ª connected with a water supply pipe 6, whereby the gas is caused to pass through a water spray in passing through such conduit section, thereby to cool the gas and to clean the same. The lower end of the conduit section 5 is connected by an elbow 5ª with a horizontal conduit section 7. The water discharged by the spray into the conduit section 5, together with the impurities removed thereby from the gas, is delivered by a pipe 8 into a trap, said trap consisting of a receptacle 9 having an overflow 10 near the top thereof.

The conduit section 7 delivers into a mixing and diffusing tower 11. A pipe 12 having a valve 13 is arranged to discharge the liquefied hydrocarbon gas into the top of the tower by means of a "rose", or other spraying and atomizing device 14. The tower extends below the conduit section 7 and is provided with a trapped overflow pipe 15 for any hydrocarbon that may be condensed within the tower and which may not be diffused throughout the gas introduced by the conduit section 7, although, with hydrocarbons of the character referred to hereinbefore, no such condensation will occur, as they will immediately assume a permanent gaseous form as soon as they are delivered into the tower 11, the pressure thereof being released at such time. Should any hydrocarbon accumulate in the bottom of the tower, as indicated at 16 it will overflow through the pipe 15 and may be conducted to the original container for the same.

Extending from the lower part of the tower 11 and opposite the conduit section 7 is a conduit 17 discharging into a low-pressure tank, such as a gasometer 18. From this tank a delivery conduit 19 extends to the point or points of use for the gas.

As a modification of the means for mixing the hydrocarbon with the blue water gas, the hydrocarbon may be delivered through a pipe 20 and a valve 21 to a spray nozzle 22 arranged axially within the conduit section 7ª conducting the gas from the section 5. The conduit 7ª in this case will be extended and will deliver the gas directly into the gasometer tank.

The tower 11 will allow the blue water gas and the hydrocarbon to become thoroughly intermingled and diffused.

My process is particularly advantageous in connection with the particular hydrocarbons mentioned herein and liquefied hydrocarbons which assume a gaseous condition as soon as the liquid-producing pressure is released. As the gas resulting from such reduction in pressure is fixed in each case, there will be no re-condensation under ordinary atmospheric conditions. Due to the rapidity with which such liquefied gases assume the gaseous or aeriform condition as soon as the pressure is released, a complete mixture of the same with the blue water gas will be obtained in the tower 11; and the proportions of the enriching gas to the blue water gas may be varied, purely in accordance with the respective rates of delivery of the blue water gas and of the liquefied enriching gas to the tower. This enables me, without any additional apparatus than that indicated in the drawing herein, to produce a gas for domestic purposes having any desired range of B. t. u.'s.

It will be evident that the B. t. u. content of the blue water gas will be increased in proportion to the amount of hydrocarbon mingled therewith. A gas having a B. t. u. content of 600 per cubic foot will be very efficient for domestic and factory fuel purposes; and such a gas will be produced by incorporating any of the hydrocarbon gases or vapors such as specified hereinbefore in a proportion of not materially more than 50 percent of such gas.

Advantageous results can be obtained by incorporating with the blue water gas a hydrocarbon gas or vapor in a proportion as low as not materially less than 5 percent of the mixture; and my invention contemplates a mixture having such low hydrocarbon content.

Furthermore, under some conditions, it may be necessary to increase the proportion of hydrocarbon gas or vapor above the upper limit of 50 percent; also to employ a mixture of two or more hydrocarbon gases or vapors with the unenriched, or blue water gas instead of employing a single gas or vapor in such mixture.

A gas produced in accordance with my invention may be used as a substitute for ordinary artificial gas for domestic cooking and heating purposes, as well as for general factory use; and it may be stored in a gasometer or similar low-pressure reservoir without material condensation or separation of the liquid hydrocarbons that have been mingled with and diffused through the blue water gas.

To insure the diffusion of the blue water gas and the gas or vapor supplied to the tower 11, the end of the conduit section 7 which enters the tower is directed upwardly, as shown at 23, the upper end being closed and the upwardly directed portion being provided with openings 23ª for the escape of the gas into the tower.

Having thus described my invention, what I claim is:

1. The process of manufacturing an enriched gas which consists in generating blue water gas, cooling such gas and conducting the same through a mixing tower or chamber, and adding to such gas while in transit through said mixing chamber or tower a regulated quantity of liquefied hydrocarbon gas having a vapor tension of not less than twenty-five pounds per square inch and not greater than five hundred pounds per square inch at atmospheric pressure and ordinary temperatures.

2. The process of manufacturing an enriched gas which comprises generating blue water gas, cooling such gas and conducting the same to a suitable low pressure reservoir, and adding to such gas while in transit a regulated quantity of liquefied hydrocarbon gas having a vapor tension of not less than twenty-five pounds per square inch and not greater than five hundred pounds per square inch at atmospheric pressure and ordinary temperatures.

3. The process of manufacturing an enriched gas which comprises generating blue water gas, cooling and cleansing such gas in transit from the generator, conducting the cooled and cleansed gas through a mixing and diffusing chamber, supplying to the gas while in said chamber a regulated quantity of liquefied hydrocarbon gas having a vapor tension of not less than twenty-five pounds per square inch at atmospheric pressure and ordinary temperatures and not greater than five hundred pounds per square inch, and delivering the gas thus formed to a suitable low-pressure storage reservoir.

4. The process of manufacturing an enriched gas which comprises generating blue water gas, cooling and cleansing the gas while in transit from the generator, mixing the cooled gas, while in transit, with a regulated quantity of liquefied hydrocarbon gas having a vapor tension of not less than twenty-five pounds per square inch and not more than five hundred pounds per square inch at atmospheric pressure and ordinary temperatures, and delivering the resultant mixture to a low-pressure storage reservoir, whereby the said gas will be enriched without material recondensation of the added hydrocarbon.

5. The process of manufacturing an enriched gas which comprises generating blue water gas, cooling and cleansing the gas with water while in transit from the generator, mixing the gas, when cooled, and while in transit, with a regulated quantity of liquefied hydrocarbon gas having a vapor tension of not less than twenty-five pounds per square inch and not more than five hundred pounds per square inch at atmospheric pressure and ordinary temperatures, and delivering the resultant mixture to a low-pressure storage reservoir, whereby the water gas will be enriched and without any material condensation of the enriched hydrocarbon.

In testimony whereof, I hereunto affix my signature.

JAMES R. ROSE.